US012303901B2

(12) United States Patent
Fang et al.

(10) Patent No.: US 12,303,901 B2
(45) Date of Patent: May 20, 2025

(54) MICROFLUIDIC DEVICE FOR DEFORMABLE BEADS ENRICHMENT AND SELF-REGULATED ORDERING AND ENCAPSULATION IN DROPLETS

(71) Applicant: PRECIGENOME, LLC, San Jose, CA (US)

(72) Inventors: Cifeng Fang, San Jose, CA (US); Chen Li, San Jose, CA (US); Yu Liu, San Jose, CA (US); Yunfeng Ling, San Jose, CA (US); Yaqi Wang, San Jose, CA (US)

(73) Assignee: PRECIGENOME, LLC, San Jose, CA (US)

( * ) Notice: Subject to any disclaimer, the term of this patent is extended or adjusted under 35 U.S.C. 154(b) by 890 days.

(21) Appl. No.: 17/278,281

(22) PCT Filed: Jan. 7, 2020

(86) PCT No.: PCT/US2020/012501
§ 371 (c)(1),
(2) Date: Mar. 19, 2021

(87) PCT Pub. No.: WO2020/146324
PCT Pub. Date: Jul. 16, 2020

(65) Prior Publication Data

US 2021/0331174 A1 Oct. 28, 2021

Related U.S. Application Data

(60) Provisional application No. 62/790,369, filed on Jan. 9, 2019.

(51) Int. Cl.
*B01L 1/00* (2006.01)
*B01L 3/00* (2006.01)

(52) U.S. Cl.
CPC ... *B01L 3/502784* (2013.01); *B01L 3/502715* (2013.01); *B01L 3/502746* (2013.01);
(Continued)

(58) Field of Classification Search
None
See application file for complete search history.

(56) References Cited

U.S. PATENT DOCUMENTS

2005/0129582 A1 6/2005 Breidford et al.
2007/0006926 A1 1/2007 Prakash et al.
(Continued)

FOREIGN PATENT DOCUMENTS

CN 101726478 A 6/2010
CN 108136401 A 6/2018
(Continued)

OTHER PUBLICATIONS

Abate, Adam et al, "Beating Poisson encapsulation statistics using close-packed ordering", Lab Chip, 2009, 9, pp. 2628-2631.
Bhagat et al, "Pinched flow coupled shear-modulated inertial microfluidics for high-throughput rate blood cell separation" Lab Chip, 2011, 11, pp. 1870-1878.
(Continued)

*Primary Examiner* — Jyoti Nagpaul
(74) *Attorney, Agent, or Firm* — Umberg Zipser LLP

(57) ABSTRACT

Disclosed herein are microfluidic devices comprising, one or more inlets in flow communication with one or more microfluidic channels, wherein the one or more inlets are adapted for receiving deformable beads, oil, and/or a suspension comprising buffer, cells, and/or particles, wherein the one or more microfluidic channels are in flow communication with the one or more inlets through a cross junction and define a fluid flow path therebetween, said fluid flow path forming a substantially planar substrate, and wherein the microfluidic channel is adapted to generate droplets. Also disclosed are methods of making and using the same.

20 Claims, 7 Drawing Sheets

(52) U.S. Cl.
CPC .................. *B01L 2200/0673* (2013.01); *B01L 2300/0627* (2013.01); *B01L 2400/02* (2013.01); *B01L 2400/086* (2013.01)

(56) References Cited

U.S. PATENT DOCUMENTS

| | | | |
|---|---|---|---|
| 2010/0097594 | A1 | 4/2010 | Cho |
| 2011/0166027 | A1 | 7/2011 | Weiner |
| 2015/0268244 | A1 | 9/2015 | Cho et al. |
| 2016/0121325 | A1 | 5/2016 | Masquelier et al. |
| 2017/0128940 | A1 | 5/2017 | Amini et al. |
| 2018/0112212 | A1 | 4/2018 | Nicol et al. |

FOREIGN PATENT DOCUMENTS

| | | | |
|---|---|---|---|
| WO | 2017015640 | A1 | 1/2017 |
| WO | 2017218486 | A1 | 12/2017 |
| WO | WO 2017/218486 | * | 12/2017 |

OTHER PUBLICATIONS

Collins, David et al, "The Poisson distribution and beyond: methods for microfluidic droplet production and single cell encapsulation", Lab Chip, The Royal Society of Chemistry 2015, 21 pages.

Edd, Jon et al, "Controlled encapsulation of single cells into monodisperse picoliter drops", Lab Chip, Aug. 2008; 8(8): pp. 1262-1264.

PCT International Search Report and Written Opinion, International Application No. PCT/US20/12501, International filing date: Jan. 7, 2020, 10 pages.

Ramji et al., "Single cell kinase signaling assay using pinched flow coupled droplet microfluidics, " Biomicrofluidics, May 19, 2014, vol. 8, Issue 3, 10 pages.

Zhang et al., "Comparative Analysis of Droplet-Based Ultra-High-Throughput Single-Cell RNA-Seq Systems," Molecular Cell, Jan. 3, 2019;73(1):130-142, 12 pages.

Zheng et al., "Massively parallel digital transcriptional profiling of single cells," Nature Communications, Jan. 16, 2017, vol. 8, Issue 14049, 12 pages.

* cited by examiner

MICROFLUIDIC DEVICE FOR DEFORMABLE BEADS ENRICHMENT AND SELF-REGULATED ORDERING AND ENCAPSULATION IN DROPLETS

This application claims priority to U.S. Provisional Application No. 62/790,369 filed on Jan. 9, 2019, the entire content of which is herein incorporated by reference.

FIELD OF THE INVENTION

The field of the invention relates to microfluidic devices in the medical and biotechnological industries, especially devices for deformable bead enrichment and self-regulated ordering and encapsulation in droplets.

BACKGROUND

All publications herein are incorporated by reference to the same extent as if each individual publication or patent application was specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

Droplet-based microfluidics has recently found popularity in applications such as chemical and biological assays. The technology involves using droplets as microreactors, in which drops are loaded with discrete objects, such as a single particle and or a single cell, and studying the behavior of that single cell. However, currently known methods do not provide a way of controlling the number of discrete objects encapsulated in one droplet. This poses a difficulty in studying single cell behavior in a highly controlled manner.

Edd, Jon F., et al. ("Controlled encapsulation of single-cells into monodisperse picolitre drops." *Lab on a Chip* 8.8 (2008): 1262-1264) disclosed a method of ordered encapsulation of particles into droplets with inertial effects. However, that method requires very long microchannel (around 60 mm) and high flow velocity (above 119 mm s−1), and therefore it is not suitable for medical consumables.

Similarly Abate, Adam R., et al. ("Beating Poisson encapsulation statistics using close-packed ordering." *Lab on a Chip* 9.18 (2009): 2628-2631) disclosed ordered encapsulation of deformable beads into droplet with close pack ordering. But this ordering design significantly increases the flow resistance in microchannel, which is not applicable for constant pressure source applications.

Thus, there exists a need in the art for new devices and methods in the art of droplet-based microfluidics that are suitable for use in the medical and biotechnological industries and applicable for constant pressure source applications.

SUMMARY OF THE INVENTION

The inventive subject matter provides devices and methods for achieving single cell barcoding. In one aspect, disclosed herein is a microfluidic device comprising: one or more inlets and one or more microfluidic channels, wherein the one or more inlets are adapted for receiving deformable beads, oil, and/or a suspension comprising buffer, cells, and/or particles, wherein the one or more microfluidic channels are in flow communication with the one or more inlets through a cross junction and define a fluid flow path therebetween, said fluid flow path forming a substantially planar substrate, and wherein the microfluidic channel is adapted to generate droplets.

In one embodiment, the microfluidic channel may be a pinch channel between two cross junctions, wherein the pinch channel has a dimension smaller than the dimension of the deformable beads. The pinch channel may synchronize deformable beads delivery frequency with droplet generation frequency. In some embodiments, the microfluidic device may further comprise a series of low hydraulic resistance reservoirs and high hydraulic resistance channels to concentrate deformable beads and compensate non-uniform distribution of deformable beads within suspension. The microfluidic device may also comprise a long funnel connected to the inlet for receiving the deformable beads, wherein the funnel guides and aligns beads into a row while maintaining delivery frequency. The droplet formed in the microfluidic device may be a water-in oil droplet or an oil-in-water droplet. The microfluidic device may also comprise a pressure control device for generating droplets in the droplet generation channel.

In one aspect, the device comprises of a channel layer with a double cross junction for deformable bead encapsulation by water-in-oil or oil-in-water emulsion. The device may also comprise a set of channels for particles/cells, another set of channels for deformable beads delivery and enrichment, and another set of channels for oil. The channels for particles/cells and the channels for deformable beads connect through cross junctions. When the mixed cell and deformable beads solution comes in contact with oil at a second junction, the micro- or nano-droplets are formed. The deformable beads flow through a series of low resistance reservoirs and high resistance channel followed by long funnel chamber before reaching the cross junction. This enables maintaining a relative constant flow of loose packed beads under constant pressure before the beads are in fluid communication with the particles/cells at the cross junction, which in turn ensures the beads to be encapsulated into droplet in a self-regulated manner, yielding high singlet encapsulation percentage.

In one embodiment, the microfluidic device may be adapted to be received by a thermal cycler, and wherein the thermal cycler comprises a flat surface to receive the microfluidic device and adapted to raise and lower the temperature of the surface in discrete, pre-programmed steps. In another aspect, the microfluidic device may be connected to a detection unit, such as an optical detection unit. In one embodiment, the optical detection unit may comprise (a) one or more emission light generators, (b) an optical detector to detect reflected and/or fluoresced light, (c) a chip stage for receiving the microfluidic device, and (d) control and memory circuitry, wherein the control circuitry may move the chip stage in XYZ directions to scan the chamber area in the microfluidic device, and wherein the memory circuitry stores the intensity and wavelength of the reflected and/or fluoresced light detected by the optical detector.

Various embodiments of the present disclosure also include a method for droplet generation having high singlet encapsulation percentage, comprising: providing a microfluidic device comprising one or more inlets and one or more microfluidic channels, wherein the one or more inlets are adapted for receiving deformable beads, oil, and/or a suspension comprising buffer, cells, and/or particles, wherein the one or more microfluidic channels are in flow communication with the one or more inlets through a cross junction and define a fluid flow path therebetween, said fluid flow path forming a substantially planar substrate, and wherein the microfluidic channel is adapted to generate droplets; providing a sample comprising a cell in first inlet, cell lysis buffer in second inlet, and oil in third inlet; and segmenting the sample to form cell sample encapsulated into oil droplets by providing a continuous flow of deformable beads, sample, and oil through the microfluidic device, wherein each droplet comprises a deformable bead and a single cell sample.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

Exemplary embodiments are illustrated in referenced figures. It is intended that the embodiments and figures disclosed herein are to be considered illustrative rather than restrictive.

DETAILED DESCRIPTION

Figure 1:
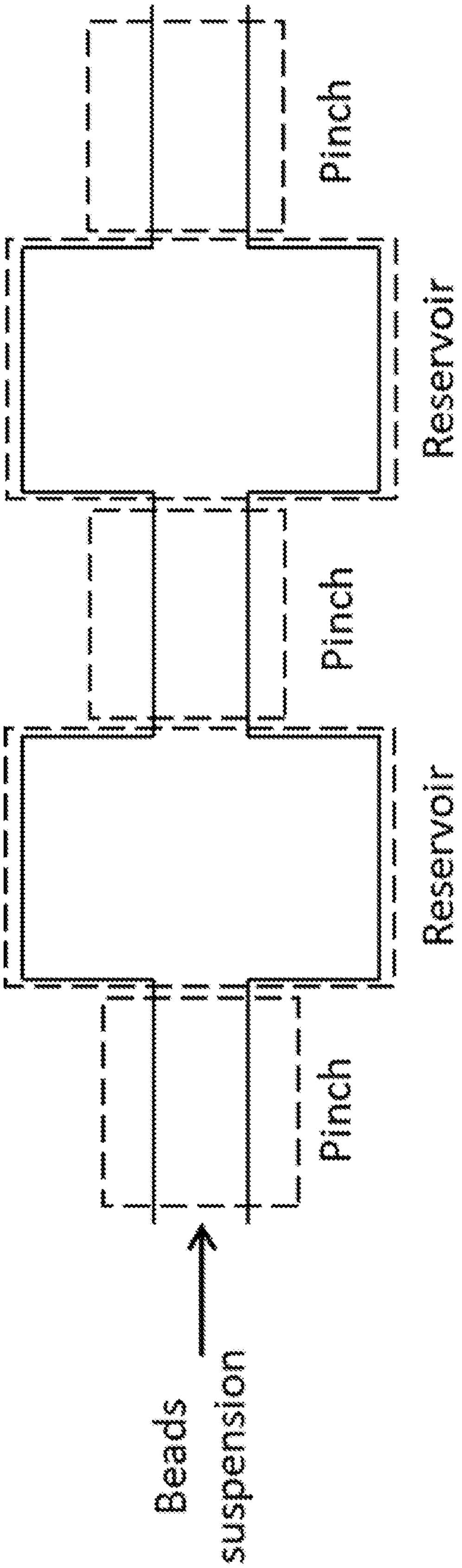
FIG. 1 depicts, in accordance with embodiments herein, schematic of pinch and reservoir sequences for beads concentrating and deliver frequency stabilizing

As described herein, in accordance with the various embodiments herein, the inventors have developed a microfluidic device which enriches and regulates deformable beads delivery inside channel, thereby achieving high percentage of singlet encapsulation. For example, in one especially contemplated aspect of the inventive subject matter, the microfluidic device may comprise one or more inlets in flow communication with one or more microfluidic channels. In some embodiments, the one or more inlets are adapted for receiving deformable beads, oil, and/or a suspension comprising buffer, cells, and/or particles. In one embodiment, the one or more microfluidic channels are in flow communication with the one or more inlets through a cross junction and define a fluid flow path between the microfluidic channels and the inlets. The fluid flow path is contemplated to form a substantially planar substrate. In some embodiments, the microfluidic channel is adapted to generate droplets for medical or biotechnological applications.

As would be known to a skilled artisan in the art, droplet-based microfluidics have found popularity in applications such as chemical and biological assays that use droplets as microreactors, in which drops were loaded with discrete objects, such as particles and cells. Random encapsulation methods are currently being used to avoid multiple discrete objects encapsulated within one droplet. In this method, very low concentration of discrete objects suspension must be used, as the number of discrete objects encapsulated per droplet is dictated by Poisson statistics, which reduces the proportion of droplets that contain the desired number of discrete objects and thus the effective rate at which single object can be encapsulated. See Collins, David J., et al. “The Poisson distribution and beyond: methods for microfluidic droplet production and single cell encapsulation.” Lab on a Chip 15.17 (2015): 3439-3459, which is incorporated by reference herein in its entirety.

Edd, Jon et al tried to achieve inertial effect-based discrete objects ordering by forcing discrete objects through a high aspect-ratio microchannel with long microchannel (around 60 mm long) and high flow velocity (above 119 mm $s^{-1}$), an inertial effect-based discrete objects ordering can be achieved. (See Edd, Jon F., et al. “Controlled encapsulation of single-cells into monodisperse picolitre drops.” *Lab on a Chip* 8.8 (2008): 1262-1264, which is incorporated by reference herein). However, as this ordering manner requires very long microchannel (around 60 mm) and high flow velocity (above 119 mm $s^{-1}$), it is not applicable in medical consumables.

Abate, Adam et al disclosed that by compressing deformable beads and forcing them into a close packed hexagonal array, a close pack ordering of deformable beads can be achieved. (See Abate, Adam R., et al. “Beating Poisson encapsulation statistics using close-packed ordering.” *Lab on a Chip* 9.18 (2009): 2628-2631, which is incorporated by reference herein). However, this ordering design significantly increases the flow resistance in microchannel, which can be overcome in a constant flow rate syringe pump driving system but is not applicable for constant pressure source applications.

For the currently known methods of microfluidic based deformable beads packing, syringe pumps are typically used. However, such use of syringe pumps has several drawbacks in the medical device industry, such as medical instrument applications as stated below. First, syringe pump delivers fluid by flow rate control. Some applications require precise pressure control. Second, syringe pump directly contacts sample fluid which could cause cross contamination from different samples. Multiple wash steps are required to reduce the contamination. This operation causes longer total turnaround time. Yet, cross contamination is difficult to avoid. Third, integration of syringe pump involves lots of tubing, which could make integrated instrument cumbersome. Due to the above reasons, a pressure pump based constant pressure driven system is preferred in medical instrument, rather than a syringe pump method.

However, challenges arise when applying constant pressure source to microfluidic based deformable beads ordering, as follows: 1) Hydraulic resistance inside microfluidic channel can vary within large range depending on the manner deformable beads were packed inside microfluidic channels, which won't be a problem for a syringe pump based on its constant flow rate nature, but will cause a constant pressure source system to fail due to the big variation of fluid flow rate inside the microfluidic device; 2) Interference factors, like the pressure variation from pressure source, dimension variation of microfluidic device from fabrication, size and concentration variation of deformable bead suspension, will increase the difficulty to achieve robust high percentage singlet encapsulation with a constant pressure source system.

The instant inventors found a solution to these current problems in the industry by designing a microfluidic device that can reliably achieve high percentage singlet encapsulation with a constant pressure source system, as disclosed throughout this disclosure. As disclosed herein, the inventors have developed and described microfluidic devices that can concentrate deformable beads and maintain a relative constant flow of loose packed beads under constant pressure while beads can still be encapsulated into droplet in a self-regulated manner, yielding high singlet encapsulation percentage. Viewed from another perspective, the inventors describe herein a microfluidic device which enriches and regulates deformable beads delivery inside channel, achieving high percentage singlet encapsulation.

Current literature about deformable beads ordered delivery in microfluidics uses syringe pump as driving force due to its constant flow rate feature. This is widely used in academic applications and part of industrial applications; however, it disadvantages for use in medical devices and biotechnology. Disadvantages include 1) loss of reagent due to tubing priming; 2) cross contamination potential from syringes and tubing; 3) air bubble accumulation inside the tubing, so that constant pressure source is more widely used in industrial/medical instrument of microfluidics. For constant pressure application scenarios, the inconsistency of resistance of deformable beads suspension inside the microchannel interferes with the stability of deformable beads ordered delivery at constant frequency, causing the failure in high rate of one-droplet-one-beads encapsulation, which is highly relied on the synchronization of droplet generation frequency and deformable beads delivery frequency. The currently disclosed devices and methods overcome the above challenges and provide a reliable synchronization between droplet generation and deformable beads delivery.

Figure 2:
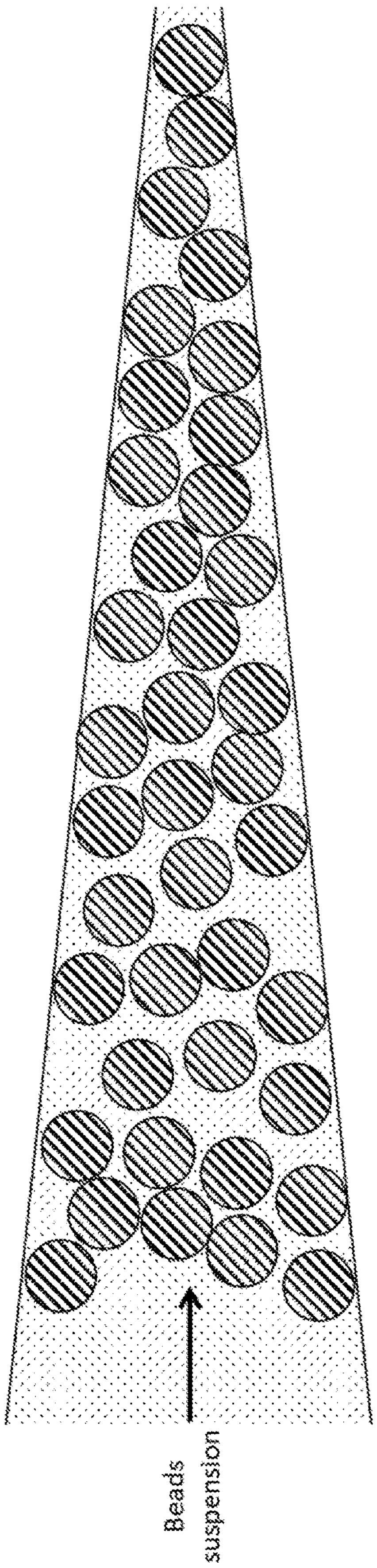
FIG. 2 depicts, in accordance with embodiments herein, schematic illustrating the funnel channel guiding and aligning deformable beads into single row

To overcome the inconsistency from the deformable bead suspension, the inventors developed several design factors, as disclosed below. First, the inventors developed a core design to achieve robust ordered delivery of deformable beads within a constant pressure source system, as illustrated below in FIG. 1. Second, the inventors developed a long funnel to guide and align deformable beads into single row, as illustrated in FIG. 2. Finally, the inventors developed a core design to achieve self-regulated beads in droplet encapsulation within a constant pressure source system, as illustrated in FIG. 3.

The realization of droplet based single cells sequencing technology relies on high percentage of one-droplet-one-bead encapsulation, which, in turn, is dependent on the synchronization of droplet generation frequency and deformable beads delivery frequency. Currently, there are challenges arising from stabilizing the deformable barcoded beads delivery frequency in a highly ordered way. Several constraints hinder constant frequency of deformable beads delivery: 1) Hydraulic resistance inside microfluidic channel can vary within large range depending on how deformable beads were packed inside the channel; 2) Dimension variation of microfluidic device from manufacturing; 3) Concentration variation of deformable bead suspension; 4) The pressure variation from pressure source. The inventors overcame the above listed challenges to achieve robust ordered delivery of deformable beads, by developing a pinch and reservoir sequence system for beads concentrating and deliver frequency stabilizing, as illustrated in FIG. 1. In the embodiment illustrated in FIG. 1, pinch channel width or depth or both less than or equal to 100% deformable beads diameter; the reservoir channel width is at least two times of pinch channel width; and reservoir fluid resistance is less than half of pinch channel resistance.

In one embodiment, as illustrated in FIG. 2, the inventors developed a long funnel to guide and align deformable beads into single row. In one embodiment, the wide side of long funnel width is more than five times the beads diameter; the narrow side of long funnel width is mostly the same as the beads diameter; and the length of long funnel channel is contemplated to be more than ten times the beads diameter.

Figure 3:
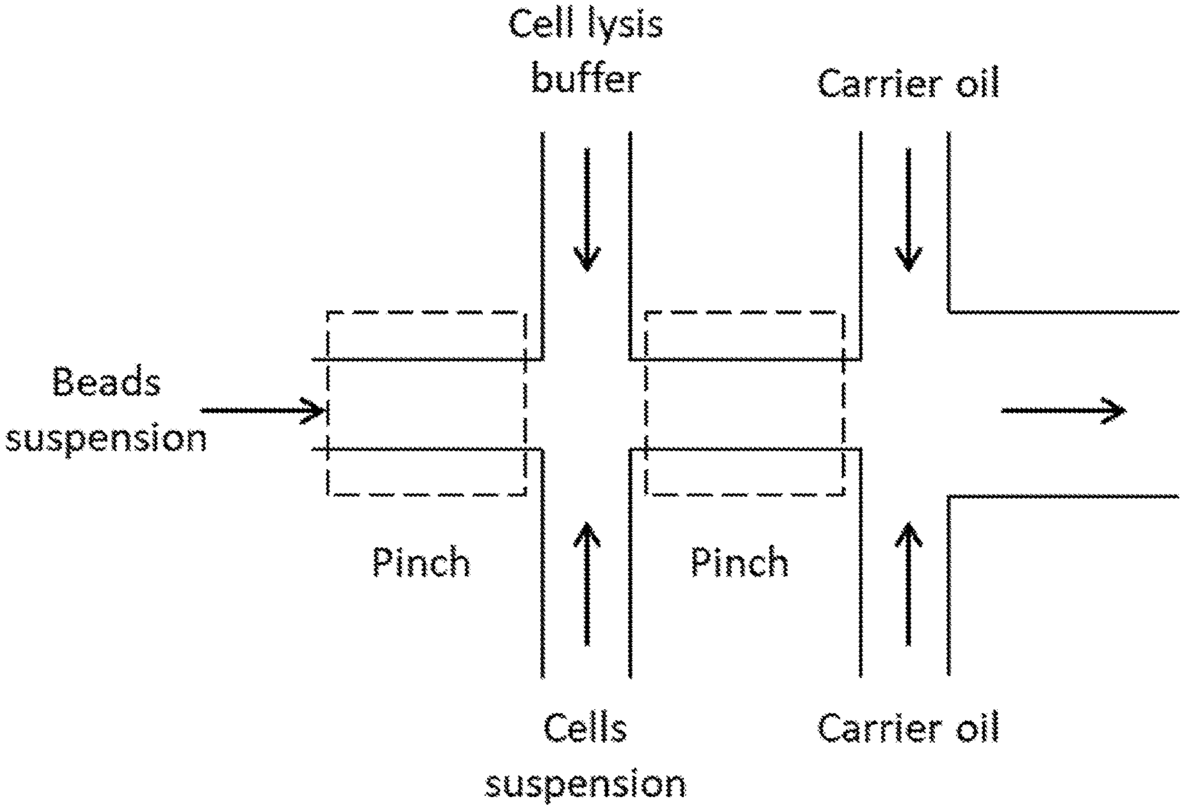
FIG. 3 depicts, in accordance with embodiments herein, schematic of double pinches at the double cross junction for self-regulated beads in droplets encapsulation.

In another embodiment, as illustrated in FIG. 3, the inventors developed a core design to achieve self-regulated beads in droplets encapsulation within a constant pressure source system. The device comprises double pinches at the double cross junction for self-regulated beads in droplets encapsulation. The pinch channel width or depth or both is contemplated to be less than or equal to 100% deformable beads diameter; and the length of secondary pinch channel is more than beads diameter.

Figure 4:
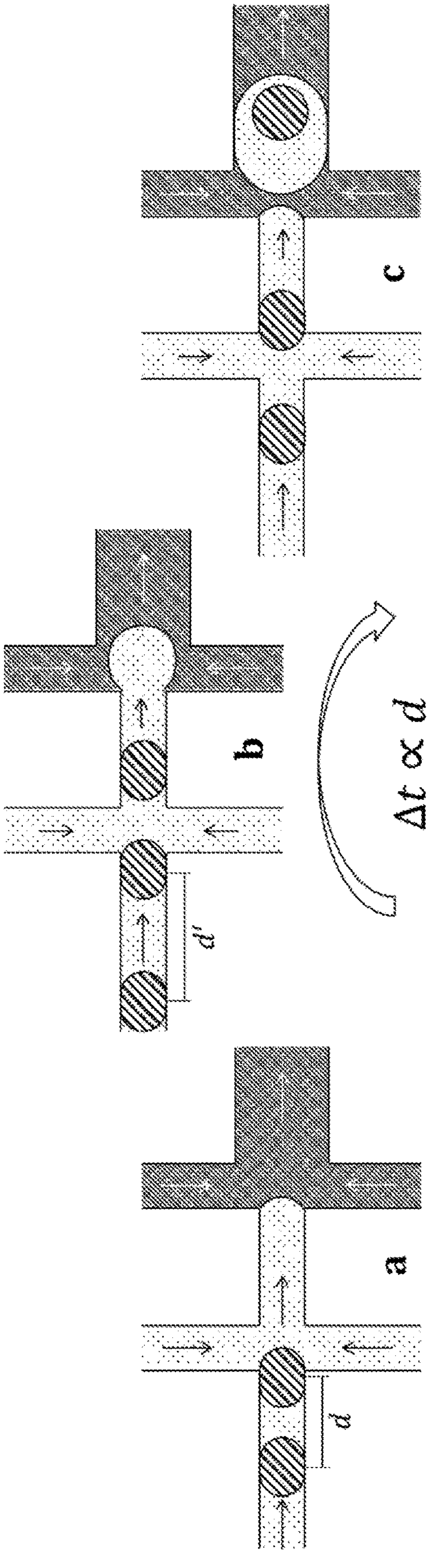
FIG. 4 depicts, in accordance with embodiments herein, schematic showing the double pinches for self-regulated beads in droplets encapsulation. Light dot domain indicates dispensed phase fluid; dark dot domain indicates continuous phase fluid, and slash domain indicates deformable beads.

In another aspect, disclosed herein is a method for droplet generation, comprising: providing a microfluidic device comprising one or more inlets in flow communication with one or more microfluidic channels as disclosed above, wherein the one or more inlets are adapted for receiving deformable beads, oil, and/or a suspension comprising buffer, cells, and/or particles, wherein the one or more microfluidic channels are in flow communication with the one or more inlets through a cross junction and define a fluid flow path therebetween, said fluid flow path forming a substantially planar substrate, and wherein the microfluidic channel is adapted to generate droplets. The method comprises providing a sample comprising a cell in first inlet, cell lysis buffer in second inlet, and oil in third inlet, and segmenting the sample to form cell sample encapsulated into oil droplets by providing a continuous flow of deformable beads, sample, and oil through the microfluidic device, wherein each droplet comprises a deformable bead and a single cell sample. FIG. 4 is a schematic of one embodiment of this method. It illustrates the concept of double pinches for self-regulated beads in droplets encapsulation. As shown in FIG. 4(*a*), two squeezed beads with distance d apart are moving towards double cross junction, d can vary within proper range. As shown in FIG. 4(*b*), spacing flow from first cross junction splitting beads, while first bead squeezed into secondary pinch channel the spacing flow rate decrease due to resistance rise. As shown in FIG. 4(*c*), when the second bead also squeezed into secondary pinch channel, it further reduces the spacing flow rate, pushes the first bead into the oil phase, the oil to water flow ratio increases, resulting in triggering the break of droplet. By repeating this bead squeezing and drop plug breaking synchronization, the time between two drop plug breaking $\Delta t$ is proportional to the distance between two adjunct deformable beads. In this way, the instant device achieves the self-regulation of loose packed deformable beads encapsulation into droplets to achieve high percentage of singlet encapsulation.

Figure 5:
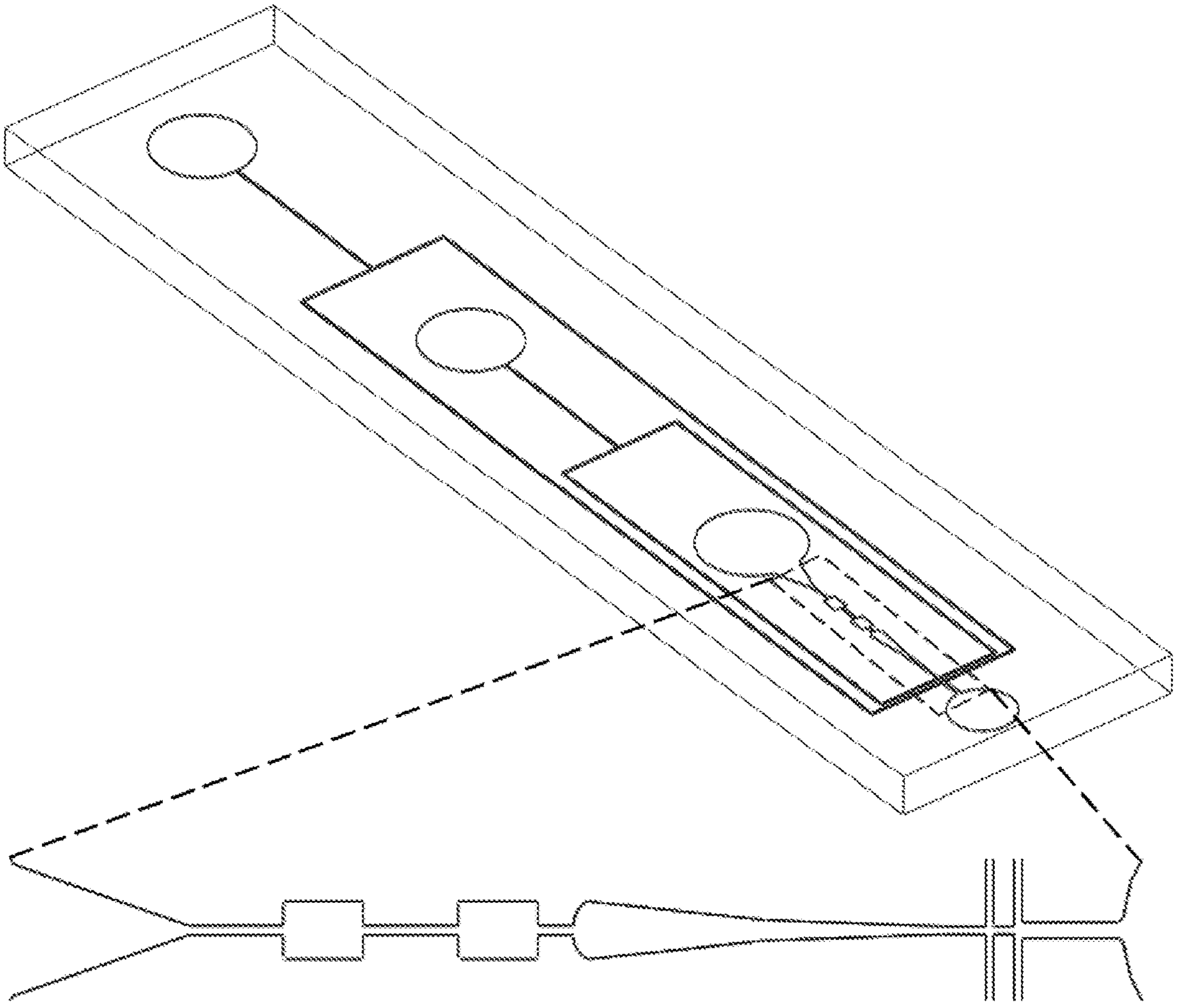
FIG. 5 depicts, in accordance with embodiments herein, wire frame plot of a microfluidic device for single cell barcoding. The enlarged view at the bottom illustrates channel layout for deformable beads concentrating and self-regulated encapsulation into droplet, consisting of pinch and reservoir sequence for deformable beads concentrating and ordering, long funnel for align beads into single row and double pinch at double cross junction for self-regulated singlet encapsulation of beads into droplets.

FIG. 5 illustrates a wire frame plot of a microfluidic device for single cell barcoding. As shown in the enlarged view at the bottom of the figure, a channel layout for deformable beads concentrating and self-regulated encapsulation into droplet is shown, consisting of pinch and reservoir sequence for deformable beads concentrating and ordering, long funnel for align beads into single row and double pinch at double cross junction for self-regulated singlet encapsulation of beads into droplets.

Figure 6:
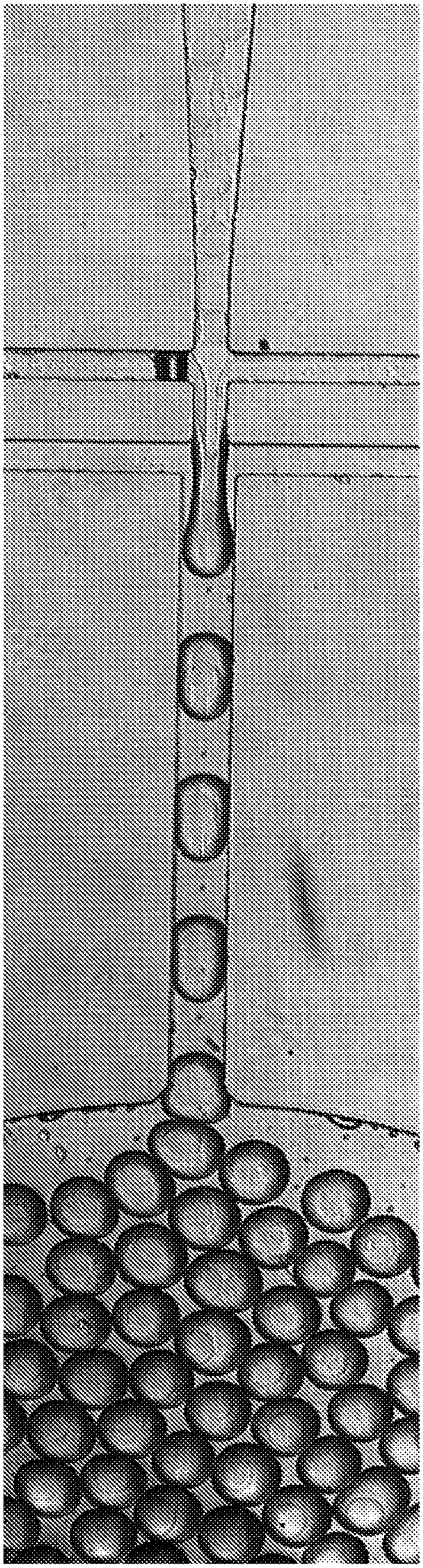
FIG. 6 depicts, in accordance with embodiments herein, a microscopy picture showing the synchronization of droplet generation with deformable beads squeezing at double pinch.

FIG. 6 illustrates a microscopy picture showing the synchronization of droplet generation with deformable beads squeezing at double pinch. From the right side of the figure, beads delivery channel, the variation of bead-to-bead distance before encapsulation can be seen. However, with the droplet generation triggering effect of the double pinch design, a high percentage of singlet encapsulation can still be achieved, which is seen in the left imaging region.

Figure 7:
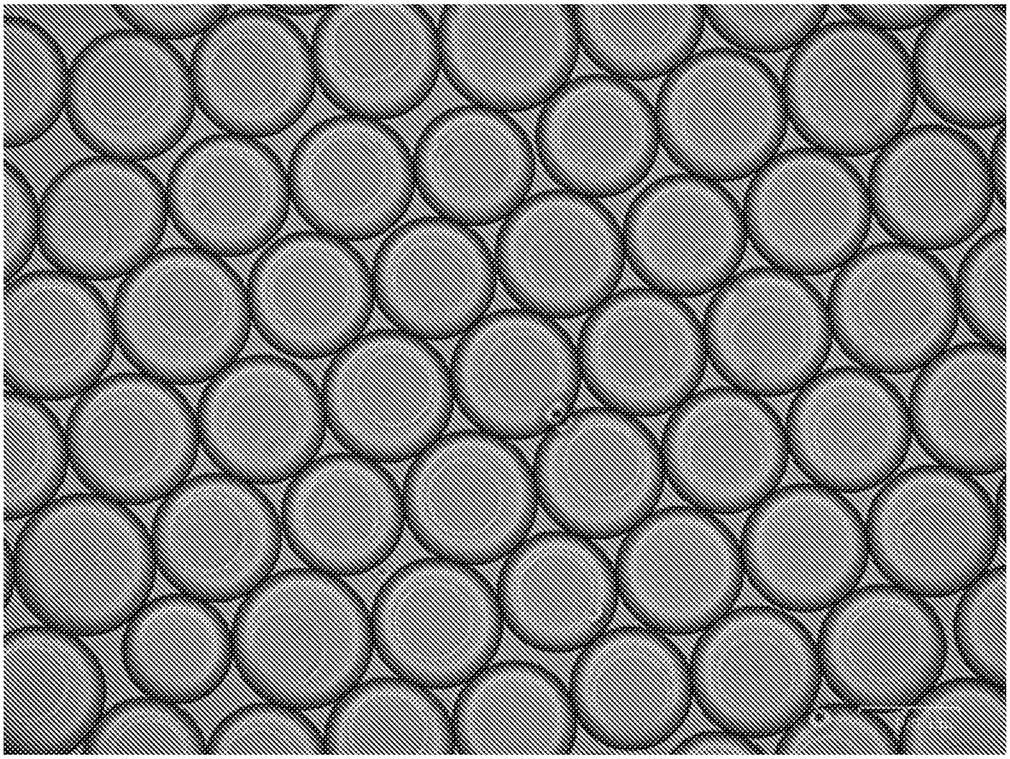
FIG. 7 depicts, in accordance with embodiments herein, a microscopy picture showing the result of high percentage singlet encapsulation.

FIG. 7 illustrates a microscopy picture showing the result of high percentage singlet encapsulation: a random sample FOV from a batch of beads in droplet encapsulation, the high percentage singlet encapsulation can be observed.

The instant discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A microfluidic device for a constant pressure source system comprising:

one or more inlets, and one or more microfluidic channels, wherein the one or more inlets are adapted for receiving deformable beads, oil, and/or a suspension comprising buffer, cells, and/or particles, wherein the one or more microfluidic channels are in flow communication with the one or more inlets through a cross junction and define a fluid flow path therebetween, said fluid flow path forming a substantially planar substrate, and wherein the microfluidic channel is adapted to generate droplets, wherein the microfluidic channel is a pinch channel between two cross junctions, and, wherein the pinch channel has a dimension smaller than the dimension of the deformable beads; and a series of low hydraulic resistance reservoirs and high hydraulic resistance channels to concentrate deformable beads and compensate non-uniform distribution of deformable beads within suspension;

wherein the microfluidic device further comprises a long funnel connected to the inlet for receiving the deformable beads, wherein the funnel guides and aligns beads into a row while maintaining delivery frequency.

2. The microfluidic device of claim 1, wherein the pinch channel synchronizes deformable beads delivery frequency with droplet generation frequency.

3. The microfluidic device of claim 1, wherein a fluid resistance of the low hydraulic resistance reservoirs is less than half of a pinch channel resistance.

4. The microfluidic device of claim 1, wherein a wide side of the long funnel is more than five times longer than a diameter of one bead.

5. The microfluidic device of claim 1, wherein the droplets are water-in oil droplets.

6. The microfluidic device of claim 1, wherein the droplets are an oil-in-water droplets.

7. The microfluidic device of claim 1, further comprising a pressure control device for generating the droplets in the droplet generation channel.

8. The microfluidic device of claim 1, wherein the microfluidic device is adapted to be received by a thermal cycler, and wherein the thermal cycler comprises a flat surface to receive the microfluidic device and adapted to raise and lower the temperature of the surface in discrete, pre-programmed steps.

9. The microfluidic device of claim 1, wherein the microfluidic device is adapted to be received by an optical detection unit, wherein the optical detection unit comprises (a) one or more emission light generators, (b) an optical detector to detect reflected and/or fluoresced light, (c) a chip stage for receiving the microfluidic device, and (d) control and memory circuitry, wherein the control circuitry may move the chip stage in XYZ directions to scan the chamber area in the microfluidic device, and wherein the memory circuitry stores the intensity and wavelength of the reflected and/or fluoresced light detected by the optical detector.

10. A method for droplet generation and bead encapsulation with a constant pressure source system, comprising:

providing a microfluidic device comprising one or more inlets and one or more microfluidic channels, wherein the one or more inlets are adapted for receiving deformable beads, oil, and/or a suspension comprising buffer, cells, and/or particles, wherein the one or more microfluidic channels are in flow communication with the one or more inlets through a cross junction and define a fluid flow path therebetween, said fluid flow path forming a substantially planar substrate, and wherein the microfluidic channel is adapted to generate droplets; and wherein the microfluidic channel is a pinch channel between two cross junctions, wherein the pinch channel has a dimension smaller than the dimension of the deformable beads providing a sample comprising a cell in first inlet, cell lysis buffer in second inlet, and oil in third inlet;

segmenting the sample to form cell sample encapsulated into oil droplets by providing a continuous flow of deformable beads, sample, and oil through the microfluidic device, wherein each droplet comprises a deformable bead and a single cell sample; and wherein the microfluidic device further comprises a series of low hydraulic resistance reservoirs and high hydraulic resistance channels to concentrate deformable beads and compensate non-uniform distribution of deformable beads within suspension; and wherein the microfluidic device further comprises a long funnel connected to the inlet for receiving the deformable beads, wherein the funnel guides and aligns beads into a row while maintaining delivery frequency.

11. The method of claim 10, wherein the pinch channel synchronizes deformable beads delivery frequency with droplet generation frequency.

12. The method of claim 10, wherein the synchronization of deformable beads delivery frequency with droplet generation frequency in the pinch channel ensures one cell per droplet.

13. The method of claim 10, wherein the a fluid resistance of the low hydraulic resistance reservoirs is less than half of a pinch channel resistance.

14. The method of claim 10, wherein a wide side of the long funnel is more than five times longer than a diameter of one bead.

15. The method of claim 10, wherein the droplet is a water-in-oil droplet.

16. The method of claim 10, wherein the droplet is an oil-in-water droplet.

17. The method of claim 10, wherein the microfluidic device further comprises a pressure control device for generating droplets in the droplet generation channel.

18. The method of claim 10, wherein the microfluidic device is adapted to be received by a thermal cycler, and wherein the thermal cycler comprises a flat surface to receive the microfluidic device and adapted to raise and lower the temperature of the surface in discrete, pre-programmed steps.

19. The method of claim 10, wherein the microfluidic device is adapted to be received by an optical detection unit, wherein the optical detection unit comprises (a) one or more emission light generators, (b) an optical detector to detect reflected and/or fluoresced light, (c) a chip stage for receiving the microfluidic device, and (d) control and memory circuitry, wherein the control circuitry may move the chip stage in XYZ directions to scan the chamber area in the microfluidic device, and wherein the memory circuitry stores the intensity and wavelength of the reflected and/or fluoresced light detected by the optical detector.

20. The method of claim 10, wherein the microfluidic device is the microfluidic device of claim 1.

* * * * *